US006454847B1

(12) United States Patent
Iri et al.

(10) Patent No.: US 6,454,847 B1
(45) Date of Patent: Sep. 24, 2002

(54) ALUMINIUM PIGMENT

(75) Inventors: Kiyoshi Iri; Atsutoshi Sugimoto, both of Ibaraki-ken (JP)

(73) Assignee: Asahi Kasei Metals Limited (JP)

( * ) Notice: Subject to any disclaimer, the term of this patent is extended or adjusted under 35 U.S.C. 154(b) by 0 days.

(21) Appl. No.: 09/673,927

(22) PCT Filed: Apr. 19, 1999

(86) PCT No.: PCT/JP99/02072

§ 371 (c)(1),
(2), (4) Date: Oct. 20, 2000

(87) PCT Pub. No.: WO99/54074

PCT Pub. Date: Oct. 28, 1999

(30) Foreign Application Priority Data

Apr. 20, 1998 (JP) .......................................... 10-123879

(51) Int. Cl.⁷ .............................. C09C 1/64; C09C 3/04; B22F 1/00
(52) U.S. Cl. ........................................ 106/404; 106/403
(58) Field of Search ................................ 106/404, 403

(56) References Cited

U.S. PATENT DOCUMENTS 5,626,662 A * 5/1997 Urban ..................... 106/31.28

FOREIGN PATENT DOCUMENTS

| JP | A-49-14358 | 2/1974 |
|---|---|---|
| JP | B-54-36607 | 2/1976 |
| JP | B-6-68121 | 3/1989 |
| JP | 2575516 | 12/1991 |
| JP | A-7-509266 | 2/1994 |
| JP | A-7-145407 | 6/1995 |
| JP | A-8-41368 | 2/1996 |
| JP | A-8-170034 | 7/1996 |
| JP | A-9-194756 | 7/1997 |

OTHER PUBLICATIONS

Coating Jihou, N. 185, Jan., 1990, (Jan. 20, 1990), p. 13–14.

* cited by examiner

Primary Examiner—Anthony J. Green
(74) Attorney, Agent, or Firm—Pennie & Edmonds LLP

(57) ABSTRACT

The present invention provides an aluminum pigment having a high grade of optical characteristics, such as a high brightness and a high flip-flop effect. In particular, an aluminum pigment having a mean particle diameter $d_{50}$ of 5–35 $\mu$m, a ratio of the mean particle diameter $d_{50}$ ($\mu$m) to a mean thickness t ($\mu$m) of 30–90, and a mean surface roughness Ra of 20 nm or less, is disclosed. A method for manufacturing the aluminum pigment of the invention is also provided.

10 Claims, 1 Drawing Sheet

FIG. 1
FIG. 2
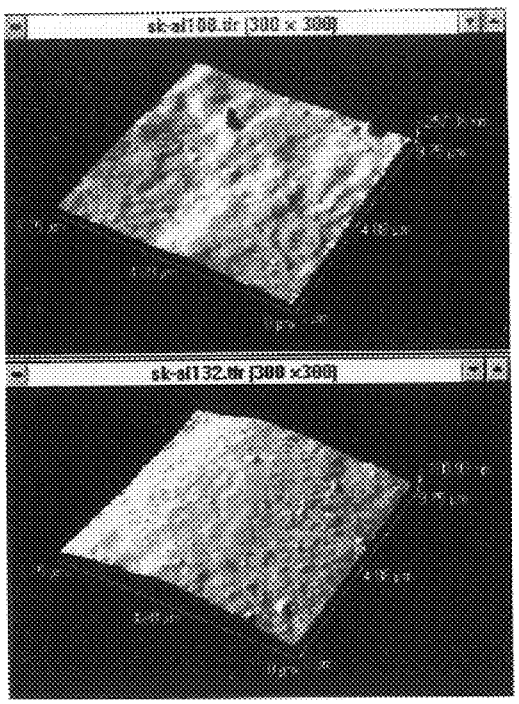
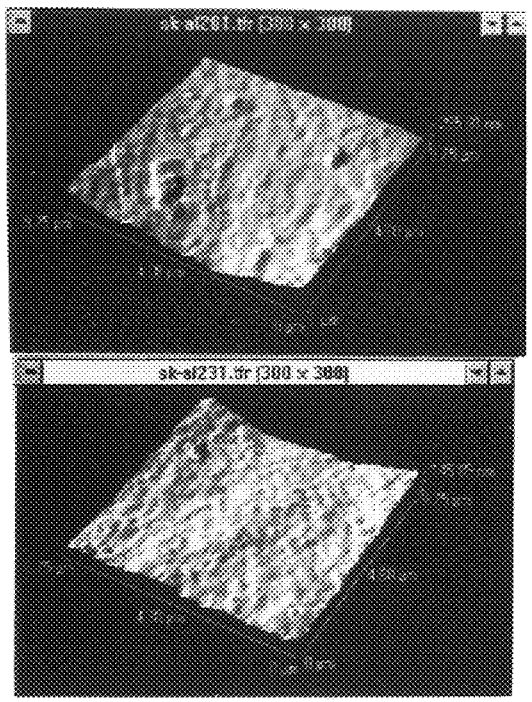

ALUMINIUM PIGMENT

TECHNICAL FIELD

The present invention relates to an aluminum pigment used in a high quality metallic paint field including high quality metallic paints for automobile bodies and parts, metallic paints for automobile repairing, household metallic paints, industrial metallic paints and the like, high quality metallic printing ink field including gravure printing, offset printing, screen printing and the like, and high quality metallic resin additive field, and manufacturing process thereof.

More specifically, the present invention relates to an aluminum pigment having high brightness and high flip-flop effect, which can provide a high light reflectance never seen before and an extremely high flip-flop effect, that is, an optical anisotropy, to paint films, prints or films formed by conventional methods in the above described applications, and manufacturing process thereof.

BACKGROUND ART

Aluminum pigments have been popularly used in the above described fields as a pigment having both a peculiar metallic texture which can not be seen with any other pigment and an excellent hiding power.

In recent years, a fashionable characteristic of automobile body painting has become more and more important, and it has been evaluated with the same or higher sense of value than are the intrinsic functions of automobiles. Especially in a trend of the fashion in automobile body painting in recent years, white color or simple glittering silver metallic tone which was deep-seated before, has lost its popularity, and a demand for a paint film having a strong brightness and a strong optical anisotropy, by which appearance of the painting changes depending on a viewing angle, has arisen.

As for the aluminum pigments aiming at obtaining such a high reflectance, and the manufacturing processes thereof, the following is known.

Japanese Patent No. 2575516 describes an aluminum pigment having both a high hiding power and a high light reflectance. JP-A-49-14358 also describes a process to obtain an aluminum pigment having a high reflectance by polishing surfaces of aluminum powder by means of wet ball-mill method. In addition, JP-B-54-36607 describes a process to form a metallic paint film which is excellent in a sparkling effect. Furthermore, JP-A-8-170034 describes an aluminum pigment providing a paint film having strongly brightening texture and excellent appearance. Still further, JP-A-7-509266 discloses metal-powder-pigment particles which are ground almost spherically.

However, none of the art can satisfy high brightness and high flip-flop effect which are presently required for an aluminum pigment.

DISCLOSURE OF THE INVENTION

The present invention provides an aluminum pigment having a high grade of optical characteristics, particularly, a high brightness and a high flip-flop effect, and a manufacturing process which enables manufacturing of such an aluminum pigment very easily with good reproducibility.

In order to solve the above problems, the inventors studied relationships between basic physical properties or optical characteristics of the aluminum pigment and manufacturing conditions earnestly and fundamentally and, as a result, found that the optical characteristics such as high brightness and high flip-flop effect can be revealed by controlling a mean particle diameter, a ratio of the mean particle diameter to the mean thickness and mean surface roughness of an aluminum pigment within respective specified ranges. Thus, the present invention was completed.

The present invention provides an aluminum pigment, which has the mean particle diameter $d_{50}$ of 5–35 µm, the ratio of the mean particle diameter $d_{50}$ (µm) to the mean thickness t (µm) of 30–90, and the mean surface roughness Ra of 20 nm or less. The present invention also provides the above described aluminum pigment which further has a mean height of irregularity in the surface roughness curve Rc of 80 nm or less.

In addition, the present invention further provides process for manufacturing the above described aluminum pigment, comprising grinding aluminum by means of a medium mixing mill or ball mill using grinding balls with a specific gravity of 5 or less in a weight ratio of 2–100 to aluminum in a grinding solvent(s). Still further, the present invention provides the above described manufacturing process wherein the diameter of the grinding balls is 4 mm or less in the above manufacturing process.

BRIEF DESCRIPTION OF THE DRAWINGS

FIG. 1 shows the photographs by an atomic force microscope (AFM) depicting the surface morphology of the aluminum-pigment particles according to the invention (Example 1).

FIG. 2 shows the photographs by an atomic force microscope (AFM) depicting the surface morphology of the aluminum-pigment particles according to Comparative Example 1.

BEST MODE FOR CARRYING OUT THE INVENTION

In the present invention, mean particle diameter $d_{50}$ (µm), mean thickness t (µm), water covering area WCA (m²/g), mean surface roughness Ra (nm) and mean height Rc (nm) of an aluminum pigment are defined as follows, respectively.

The mean particle diameter $d_{50}$ (µm) can be measured using Laser Micron Sizer LMS-24 (made by SEISHIN KIGYO Co., Ltd.), and is in a range of 5–35 µm. The mean particle diameter $d_{50}$ may be selected within the range of extremely fine mesh, fine, mesh, medium mesh, coarse mesh or extremely coarse mesh depending on the design required. The particles with the mean particle diameter of 5 µm or larger tend to orient themselves along a given direction in a paint film, and are easy to reveal a desirable brightness due to reduced light scattering. And in the particles with a mean particle diameter of 35 µm or less, little portion of the particles protrudes over the surface of paint film because the particle size does not exceed the thickness of the paint film. As a result, they are good for practical uses because they can give a metallic paint film with a fine texture.

The mean thickness t (µm) is a value calculated, according to the following equation, from WCA (m²/g), water covering area per 1 g of metal component, which is obtained by measurement.

$$t=0.4/WCA$$

The above described calculation method for the mean thickness is described in, for example, J. D. Edwards & R. I. Wray, *Aluminium Paint and Powder*, 3rd Ed., Reinhold Publishing Corp. New York (1995), Page 16–22.

Water covering area is measured according to the procedure of JIS K 5906-1991 after applying a determined pretreatment. It should be noted that the aluminum pigment of the present invention is of a non-leafing type though JIS describes a measuring method of the water covering area for the case of leafing type. However, the measuring method of water covering area in the present invention is totally same as the one for the case of leafing type described in JIS K 5906-1991 except for applying a pretreatment with 5% stearic acid in a mineral-spirits solution to the sample. The procedure for the pretreatment of the sample is described in *Review on the Raw Materials for Paints,* No. 156, Page 2–16 (Edited by Asahi Chemical Industry Co., Ltd. on Sep. 1, 1980).

The ratio of the mean particle diameter $d_{50}$ to the mean thickness t in the present invention is given by $d_{50}/t$, and means so called "flatness" of an aluminum pigment (the ratio being referred to as "flatness" hereinafter in some cases). As the aluminum powder is ground by means of a medium mixing mill or ball mill, the aluminum particles increase gradually in flatness and become easily folded when they are flattened over a certain degree. Generally, flatness over 200 makes a particle easily cracked and folded. For an aluminum pigment of the present invention, flatness is 30–90. Flatness of 90 or lower gives a smooth surface to an aluminum pigment, and results in improved brightness and also a high flip-flop effect by reducing light scattering at the surface and increasing a regular reflectance. And the flatness of 30 or higher enables a paint film to maintain a sufficient hiding power which is an important function of aluminum pigments, and makes the pigments practically usable.

The mean surface roughness Ra in the present invention is calculated according to the following method.

As an observation method for a surface morphology of an aluminum pigment, an atomic force microscope (abbreviated as AFM hereinafter) TMX-2010 (made by Topometrix) is used. As a pretreatment, an aluminum pigment as a sample is cleaned up by ultrasonic cleaning with excess methanol and chloroform, vacuum-dried, dispersed again in acetone, then dropped on a Si wafer, and air-dried. Determination of surface roughness using AFM is carried out by plotting a surface-roughness curve (a line profile of surface irregularity) with 300 scans in 5-$\mu$m square of visual field for an aluminum pigment particle which is not overlapped with another aluminum pigment particle, and calculating an arithmetic mean roughness of the roughness curve (arithmetic mean of absolute height values within 5-$\mu$m base length). The base length is 5 $\mu$m here, though it basically varies depending on the mean particle diameter $d_{50}$. In the present invention, "mean surface roughness Ra (nm)" is defined as an arithmetic mean value of arithmetic mean roughness values which are obtained for 3 or more visual fields. The terminology relating to the surface roughness are based on JIS B0660:1998.

The mean surface roughness Ra of the aluminum pigment of the present invention is 20 nm or lower, preferably 15 nm or lower. When Ra was 20 nm or lower, the pigments showed extremely superior brightness together with good flip-flop effect due to their high regular reflectance of light at their surfaces.

The mean height Rc of irregularity in the surface-roughness curve of an aluminum pigment is expressed with a sum of the mean value of absolute values of mountaintop heights and the mean value of absolute values of ravine depths in a surface roughness curve obtained as described above. More concretely, Rc in the present invention is an arithmetic mean value of the arithmetic mean heights of surface-roughness curves which are obtained by measuring 3 or more visual fields.

The mean height Rc of an aluminum pigment of the present invention is preferably 80 nm or lower. When the mean height Rc was 80 nm or lower, the pigments showed extremely superior high brightness together with good flip-flop effect.

The aluminum pigment of the present invention has little irregularities on the surface and few extremely fine particles adhered on the surface. It contains a fairly large proportion of the aluminum pigment particles each of which has an uniform thickness through all areas from the center to the edge, in an observation with a scanning electronic microscope (SEM).

As for the manufacturing process of an aluminum pigment of the present invention, preferably it is manufactured by grinding atomized aluminum powder as a raw material especially by means of a medium mixing mill or ball mill.

The specific gravity of grinding balls used in the ball mill or the like is preferably 5 or less. The specific gravity of 5 or less enables to obtain an aluminum pigment having little surface roughness. More preferably, the specific gravity is 4 or below. It should be noted that specific gravity of the grinding ball should be desirably higher than the specific gravity of a grinding solvent. If specific gravity. of the grinding ball is lower than that of the grinding solvent, grinding is not performed because the grinding balls are floated up in the solvent and no shear stress among the grinding balls is produced.

As a material for such grinding balls, any material is acceptable without any special limitation so long as it satisfies the above specific gravity range. For example, glass balls, alumina balls, zirconia balls or the like can be used. Desirably, glass balls are used from the view points of economy and quality. The surface roughness of grinding balls is preferably 0.08 $\mu$m (Grade G40) or less in the surface roughness Ra (maximum) defined in JIS B 1501 for a steel ball for ball bearing. More preferably, it is 0.04 $\mu$m (Grade G20) or less.

The diameter of grinding balls is suitably 1–4 mm. Diameter of 4 mm or less is suitable because it can suppress the remarkable prolongation of grinding time and also heightens homogeneity of mill contents during grinding. The diameter of 1 mm or more is also suitable because it can prevent an occurrence of the so-called group motion, i.e., the phenomenon in which grinding balls do not move independently but move as a group or a mass resulting in decrease of shear stress among the grinding balls and failure of grinding.

As for the aluminum powder as a raw material, atomized aluminum powder which contains little amount of impurity other than aluminum is desirable. The purity of the atomized aluminum powder is preferably 99.5% or more, more preferably 99.7% or more, and most preferably 99.8% or more.

The mean particle diameter of atomized aluminum powder is suitably 2–20 $\mu$m and more suitably 3–12 $\mu$m. An aluminum pigment with a diameter of 2 $\mu$m or larger can maintain its surface conditions and particle shape well. In addition, an aluminum pigment with a diameter of 20 $\mu$m or smaller is suitable because it can keep a flattening time of the aluminum-pigment surface by grinding short, and the history of receiving shear stress from grinding balls less, and prevent the surface from having significant irregularities which tend to increase with the flattening time.

Preferably, the shape of atomized aluminum powder is spherical, teardrop-like and the like. A needle-like powder or that with an indeterminable shape is not preferable because the shape of aluminum pigment tends to collapse easily during grinding.

The type of grinding solvent is not specially limited, and solvents having low viscosities, for example, hydrocarbon-based solvents, such as mineral spirits and solvent naphtha which have been used, alcohol-based, ether-based, ketone-based, ester-based solvents and the like may be used.

As for the grinding c9conditions for the aluminum powder, the ratio of the weight of grinding balls to the weight of aluminum in the aluminum powder is preferably 2–100, more preferably 10–100, and most preferably 14–65. The ratio of the weight of grinding balls to the weight of aluminum in the aluminum powder of 2 or more is desirable because it gives an aluminum pigment small surface roughness, high brightness and flip-flop effect. If the above described ratio is 100 or less, both the grinding time and productivity can be kept within practical ranges.

Also, the ratio of the weight of grinding solvent to the weight of aluminum in the aluminum powder is preferably 1.8–30, and more preferably 2.6–18. Grinding under the condition where the ratio of the weight of grinding solvent to the weight of aluminum exceeds the above described range is not desirable because the reflectance of the aluminum pigment drastically decreases though the hiding power can be increased. This is presumed to be caused by an uneven state in the mill.

In addition, grinding aids may be used. A material for the grinding aids is not specially specified so long as it exhibits characteristics as a non-leafing pigment. Typically, oleic acid, stearyl amine or the like is used. It is used in an amount of 1–50% by weight based on the aluminum powder.

Together with the aluminum pigment of the present invention, mica, color pigment or the like can be jointly used.

Hereunder, representative examples of the present invention are shown. Measuring methods for various physical properties used in the examples and comparative examples are as follows.

① Mean Particle Diameter: $d_{50}$

Measurement was carried out using Laser Micron Sizer LMS-24. As a measuring solvent, mineral spirits was used. An ultrasonic dispersion was applied to the samples of aluminum pigment for 2 minutes as a pretreatment.

② Mean Thickness: t

Firstly, 1 g of the aluminum pigment was pre-dispersed by adding 1–2 ml of 5% stearic acid solution in mineral spirits, followed by adding 50 ml of petroleum benzine, and mixing. After heating at 40–45° C. for 2 hours, the pigment was filtered under a reduced pressure to obtain a powder. Water covering area was measured with these samples. From these measured data, mean thickness: t was calculated according to the following formula.

$$t(\mu m) = 0.4/WCA(m^2/g)$$

③ Mean Surface Roughness: Ra

Using an atomic force microscope (AFM), line profiles (300 scans) of the aluminum pigment were measured for a visual field of 5-$\mu$m square; then arithmetic mean surface roughness was calculated from these data. This procedure was repeated for 3 or more visual fields in total, then Ra was obtained by calculating an arithmetic mean of these values.

④ Mean Height of Irregularity in Surface Roughness Curve: Rc

From the same line profiles as obtained in the above ③, the mean height of irregularity in the surf ace-roughness curve was obtained. The same procedures were repeated for 3 or more visual fields in total; then Rc was obtained by calculating an arithmetic mean of these values.

⑤ Evaluation of Brightness and Flip-flop Effect (1) Preparation of Paints and Paint Films After 5 g of the aluminum pigment were premixed with 8 g of ACRIC No. 2000GL thinner (made by Kansai Paint Co., Ltd.), 97 g of ACRIC No. 2026GL Clear (made by Kansai Paint Co., Ltd.) were further added; then the mixture was shaken for 10 minutes with a paint shaker. From the silver-metallic paint obtained, a paint film was prepared on a sheet of art paper with 9-mil applicator, then dried at room temperature.

(2) Colorimetry

According to the method described in *Research of Paints*, No. 117, Page 67–72 (Published by Kansai Paint Co., Ltd. in 1989), an evaluation was carried out using a laser type metallic-texture measuring apparatus ALCOPE LMR-2000 (made by Kansai Paint Co., Ltd.). The measurement was performed under the optical conditions in which a laser light source was arranged at 45 degrees of incident angle, and the receptors were arranged at 0 degree and −35 degrees of light reception angles.

An IV value was obtained at −35 degrees of light-reception angle where the highest light intensity was obtained among reflected laser light, except for the light in a mirror reflection region which was a reflected light from a paint film surface. The IV value is a parameter proportional to an intensity of regular reflection from aluminum pigments, and exhibits an extent of brightness.

Also, a variation in intensity of reflection light was measured by changing an observation angle (light-reception angle). An FF value was obtained by non-dimensionalizing an extent of the variation in intensity of reflection light with a mean reflection intensity. The FF value is a parameter proportional to an extent of orientation of aluminum pigments, and exhibits an extent of pigment flip-flop effect.

EXAMPLE 1

A mixture of 250 g of atomized aluminum powder (mean particle diameter 6 $\mu$m), 1.2 kg of mineral spirits and 25 g of oleic acid, was charged in a ball mill which was 30 cm in inner diameter and 35 cm in length, and then ground at 60 rpm for 10 hours using 15 kg of glass beads (specific gravity 2.6) with a diameter of 3 mm.

After the grinding was finished, the slurry in the mill was washed out with mineral spirits followed by screening with a vibrating screen of 400 mesh. The slurry under the screen was filtered with a filter, concentrated, and gave a cake of heating residue 80%. The cake obtained was transferred into a vertical mixer, added with a determined amount of solvent naphtha, mixed for 15 minutes, and gave an aluminum pigment of heating residue 75%.

On the aluminum pigment obtained, evaluations of brightness and flip-flop effect were carried out. Results are shown in Table 1.

EXAMPLE 2

The same procedures as in Example 1 were repeated except that the mean particle diameter of the atomized aluminum powder as a raw material and the grinding time were changed to 10 $\mu$m and 15 hours, respectively, and an aluminum pigment was obtained. Evaluations of brightness and flip-flop effect were carried out on this pigment. Results are shown in Table 1.

EXAMPLE 3

The same procedures as in Example 1 were repeated except that the mean particle diameter of the atomized aluminum powder as a raw material, was 8 $\mu$m, and the grinding was carried out at 60 rpm for 12 hours using glass beads with a diameter of 2 mm and with the weight ratios of grinding balls and the grinding solvent each to aluminum as shown in Table 1, and an aluminum pigment was obtained. On this pigment, evaluations of brightness and flip-flop effect were carried out. Results are shown in Table 1.

Comparative Example 1

The atomized aluminum powder with a mean particle diameter of 30 μm as a raw material and a media agitating mill equipped with a jacket with a capacity of 4.9 L as an apparatus, were used. In a container of the media agitating mill, 9 kg of glass beads with a diameter of 7 mm–13 mm, 0.9 kg of mineral spirits and 20 g of stearyl amine, were charged. The agitator was rotated at 27 rpm, and 1.5 minutes later, 600 g of the above described aluminum raw material were gradually charged. After completion of the charge, the agitator was rotated at the same rate for another 5 minutes, then operated at 100 rpm for 5 hours for pulverization. After that, the slurry in the media agitating mill was washed out with mineral spirits, and passed through a vibrating screen of 400 mesh. The slurry under the screen was filtered with a filter, concentrated, and gave a cake of heating residue 78%. The cake obtained was transferred into a vertical mixer, added with a determined amount of solvent naphtha, mixed for 15 minutes, and gave an aluminum pigment of heating residue 75%.

On the aluminum pigment obtained, evaluations of brightness and flip-flop effect were carried out. Results are shown in Table 1.

Comparative Example 2

A mixture of 600 g of the atomized aluminum powder (mean particle diameter 20 μm), 1.2 kg of mineral spirits and 6 g of stearic acid, was charged in a ball mill of 30 cm in inner diameter and 35 cm in length, then ground at 60 rpm for 5 hours using steel balls (specific gravity 7.8) with a diameter of 4.8 mm.

After the grinding was finished, the slurry in the mill was washed out with mineral spirits, passed through a vibrating screen of 400 mesh. The slurry under the screen was filtered with a filter, concentrated, and gave a cake of heating residue 87%. The cake obtained was transferred into a vertical mixer, added with a determined amount of solvent naphtha, mixed for 15 minutes, and gave an aluminum pigment of heating residue 75%.

On the aluminum pigment obtained, evaluations of brightness and flip-flop effect were carried out. Results are shown in Table 1.

Comparative Example 3

In a ball mill of 30 cm in inner diameter and 35 cm in length, 250 g of spherical atomized aluminum powder (mean particle diameter 12 μm, an aspect ratio approximately 1.5:1 to 1:1) and 250 g of oleic acid, were charged, and then pulverized at 60 rpm for 5 hours using steel balls (specific gravity 7.8) with a diameter of 3.2 mm.

After the pulverization was finished, the content of the mill was washed out with mineral oil, and passed through a vibrating screen. The slurry under the screen was filtered with a filter, concentrated, and gave an aluminum pigment of heating residue 95%. The above described measurements were carried out on the powdery aluminum pigment obtained. In preparation of paints for the evaluations of brightness and flip-flop effect, a silver metallic paint was formulated by adjusting the heating residue (95%) of the above described aluminum pigment to a standard heating residue 75%.

In addition, from an observation by a scanning electron microscope, it was found that the shape of the aluminum pigment obtained was not flaky but close to a spherical atomized-aluminum powder of raw material with a smaller aspect ratio than approximately 2:1.

The water covering area could not be measured since the shape was not flaky.

Industrial Applicability

An aluminum pigment of the present invention is useful as an aluminum pigment for oil-based and water-based metallic paints for automobiles or the like, and also useful for aluminum pigments for inks and resin additives.

TABLE 1

| | grinding ball | | grinding ball/ aluminum | grinding solvent/ aluminum | raw aluminum mean | grinding aid/ aluminum | | | | | | | | | |
|---|---|---|---|---|---|---|---|---|---|---|---|---|---|---|---|
| | diameter | specific gravity | weight ratio | weight ratio | particle diameter | material | weight ratio | $d_{50}$ (μm) | WCA (m²/g) | t (μm) | $d_{50}/t$ | Ra (nm) | Rc (nm) | IV value | FF value |
| Example 1 | 3 mm | 2.6 | 15 kg/ 0.25 kg (60.7) | 1.2 kg/ 0.25 kg (4.8) | 6 μm | oleic acid | 0.1 | 14 | 1.2 | 0.3 | 47 | 7.5 | 70 | 380 | 1.80 |
| Example 2 | 3 mm | 2.6 | 15 kg/ 0.25 kg (60.7) | 1.2 kg/ 0.25 kg (4.8) | 10 μM | oleic acid | 0.1 | 31 | 0.8 | 0.5 | 62 | 12.1 | 60 | 395 | 1.89 |
| Example 3 | 2 mm | 2.6 | 7.5 kg/ 0.25 kg (30) | 1.6 kg/ 0.25 kg (6.4) | 8 μm | oleic acid | 0.2 | 18 | 1.0 | 0.4 | 45 | 10.5 | 65 | 385 | 1.85 |
| Comparative Example 1 | 7 mm– 13 mm | 2.6 | 9 kg/ 0.6 kg (15.1) | 0.9 kg/ 0.6 kg (1.5) | 30 μm | stearyl amine | 0.03 | 26 | 0.4 | 1.0 | 26 | 21.0 | 100 | 230 | 1.45 |
| Comparative | 4.8 mm | 7.8 | 18 kg/ 0.6 kg | 1.2 kg/ 0.6 kg | 20 μm | stearic acid | 0.01 | 25 | 1.3 | 0.3 | 83 | 32.5 | 110 | 185 | 1.05 |

TABLE 1-continued

| | grinding ball | | grinding ball/ aluminum weight ratio | grinding solvent/ aluminum weight ratio | raw aluminum mean particle diameter | grinding aid/ aluminum | | $d_{50}$ ($\mu$m) | WCA (m²/g) | t ($\mu$m) | $d_{50}/t$ | Ra (nm) | Rc (nm) | IV value | FF value |
|---|---|---|---|---|---|---|---|---|---|---|---|---|---|---|---|
| | diameter | specific gravity | | | | material | weight ratio | | | | | | | | |
| Example 1 Comparative Example 1 | 3.2 mm | 7.8 | (30) 1 kg/ 0.25 kg (4) | (2.0) 0 kg/ 0.25 kg (0) | 12 $\mu$m | oleic acid | 1.0 | 13 | not measurable | not measurable | <2 | >50 | >200 | 85 | 0.5 |

What is claimed is:

1. An aluminum pigment, wherein a mean particle diameter $d_{50}$ is 5–35 $\mu$m, a ratio of the mean particle diameter $d_{50}$ ($\mu$m) to a mean thickness ($\mu$m) is 30–90, and a mean surface roughness Ra is 20 nm or less.

2. The aluminum pigment according to claim 1, wherein the mean surface roughness Ra is 15 rim or less.

3. The aluminum pigment according to claim 1, wherein a mean height Rc of irregularity in a surface-roughness curve is 80 nm or less.

4. The aluminum pigment according to claim 2, wherein a mean height Rc of irregularity in the surface-roughness curve is 80 nm or less.

5. A process for manufacturing the aluminum pigment according to claim 1, comprising grinding aluminum in a grinding solvent by means of medium mixing mill or ball mill using a grinding ball having a specific gravity of 5 or less in a weight ratio of 2–100 to the aluminum.

6. The process according to claim 5, wherein the weight ratio is 10–100.

7. The process according to claim 5, wherein a diameter of the grinding balls is 1–4 mm, inclusively.

8. The process according to claim 6, wherein a diameter of the grinding balls is 1–4 mm, inclusively.

9. The process according to claim 5, wherein the aluminum to be ground is an atomized aluminum powder and its mean particle diameter is 2–20 $\mu$m.

10. The process according to claim 5, wherein the grinding solvent is used in a weight ratio of 1.8–30 to the weight of aluminum.

* * * * *